US012580793B2

(12) United States Patent
Yue et al.

(10) Patent No.:  US 12,580,793 B2
(45) Date of Patent:      Mar. 17, 2026

(54) JOINT TIMING OFFSET, FREQUENCY OFFSET, AND CHANNEL ESTIMATION

(71) Applicant: GOOGLE LLC, Mountain View, CA (US)

(72) Inventors: Guosen Yue, Edison, NJ (US); Jibing Wang, San Jose, CA (US)

(73) Assignee: GOOGLE LLC, Mountain View, CA (US)

( * ) Notice:    Subject to any disclaimer, the term of this patent is extended or adjusted under 35 U.S.C. 154(b) by 0 days.

(21) Appl. No.: 18/764,807

(22) Filed:    Jul. 5, 2024

(65)                Prior Publication Data

US 2025/0016030 A1      Jan. 9, 2025

Related U.S. Application Data

(60) Provisional application No. 63/525,428, filed on Jul. 7, 2023.

(51) Int. Cl.
*H04L 25/02*              (2006.01)
(52) U.S. Cl.
CPC ........ *H04L 25/0204* (2013.01); *H04L 25/022* (2013.01); *H04L 25/0222* (2013.01)
(58) Field of Classification Search
CPC ........................ H04L 25/0204; H04L 25/022; H04L 25/0222
See application file for complete search history.

(56)                References Cited

U.S. PATENT DOCUMENTS

2012/0224659  A1*   9/2012   Yu ....................... H04L 25/0226
                                              375/340

FOREIGN PATENT DOCUMENTS

CN            115333899  A   *  11/2022   ............. H04W 72/04
EP              2768190  A2  *   8/2014   ......... H04L 25/0204
WO      WO-2019205110  A1  *  10/2019   ............. H04L 27/00

OTHER PUBLICATIONS

Haley, Gregory, "Nanoimprint Finally Finds its Footing", Semiconductor Engineering; Apr. 20, 2023; downloaded from <<https://semiengineering.com/nanoimprint-finds-its-footing-in-photonics/>>; 18 pages.

* cited by examiner

*Primary Examiner* — Freshteh N Aghdam

(57)                ABSTRACT
A receiver receives signals from a transmitter in subframes on subcarriers having orthogonal frequencies. A subset of the subframes include reference signals. The receiver generates a first channel estimate for a target subframe based on reference signals in the target subframe. The receiver also generates one or more second channel estimates for one or more other subframes based on one or reference signals in the other subframes. The receiver combines the first channel estimate and the one or more second channel estimates based on a frequency offset between the receiver and the transmitter to form a channel estimate of the target subframe. In some cases, the receiver performs joint estimates of a timing offset, a frequency offset, and a channel for the target subframe based on the reference signals, selected candidate timing offsets, selected candidate frequency offsets, and selected candidate channel estimates.

18 Claims, 11 Drawing Sheets

200

201 202 203 204 205 206 207 208 209 210

216   217

215

400

500

900

PERFORM JOINT TIMING OFFSET, FREQUENCY OFFSET, AND CHANNEL ESTIMATION

905

CHOOOSE CHANNEL ESTIMATE WINDOW AND REFERENCE SIGNALS

910

AVERAGE CHANNEL ESTIMATES OVER SELECTED SUBFRAMES BASED ON OFFSET COMPENSATION

915

OFFSET DECOMPENSATION ON TARGET SUBFRAMES FOR DEMODULATION

920

1000

1005 — GENERATE CANDIDATE SET OF OFFSETS

1010 — CHOOSE TIME/FREQUENCY OFFSETS FROM SET

1015 — GENERATE CHANNEL ESTIMATE BASED ON TIME/ FREQUENCY OFFSETS

1020 — MORE CANDIDATE OFFSETS?

YES

NO

1025 — GENERATE JOINT TIMING OFFSET, FREQUENCY OFFSET, AND CHANNEL ESTIMATE

JOINT TIMING OFFSET, FREQUENCY OFFSET, AND CHANNEL ESTIMATION

BACKGROUND

Orthogonal frequency division multiplexing (OFDM) is used to convey information on a set of subcarriers in the frequency domain. Orthogonality of the subcarriers is insured by spacing the subcarriers so that the peak of each subcarrier corresponds to nulls (or zero crossings) of the adjacent subcarriers. At the transmitter, data represented by an incoming bitstream is divided into multiple streams corresponding to the subcarriers. The subcarriers are modulated to convey information representing the bitstreams in parallel. At the receiver, the subcarriers are demodulated and decoded to reproduce the data in the incoming bitstream. The orthogonality of the subcarriers reduces the overlap between different OFDM symbols, which is referred to as inter-symbol interference (ISI), and energy leakage from a subcarrier to adjacent subcarriers, which is referred to as inter-carrier interference (ICI). Multipath fading of signals transmitted over the air interface increases the interference between the subcarriers, which is typically addressed by introducing a guard band or cyclic prefix at the beginning of each symbol.

Narrow Band Internet of Things (NB-IoT) is a low-power wide-area network (LP WAN) radio technology standard developed by the Third Generation Partnership Project (3GPP) for cellular network devices and services. The NB-IoT standard is designed to support indoor coverage for a high connection density of low-cost devices that have long battery life. The devices communicate in a single narrow-band of 200 kHz using OFDM modulation for downlink communication and single carrier-frequency division multiple access (SC-FDMA) for uplink communication. Advantages of NB-IoT include support for large numbers of low complexity devices and bandwidth efficiency. Strong signal strength in NB-IoT devices allow signals to penetrate obstacles and building materials such as brick, concrete, and metal. The low power consumption of NB-IoT devices reduce the cost and allow multi-year battery life.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
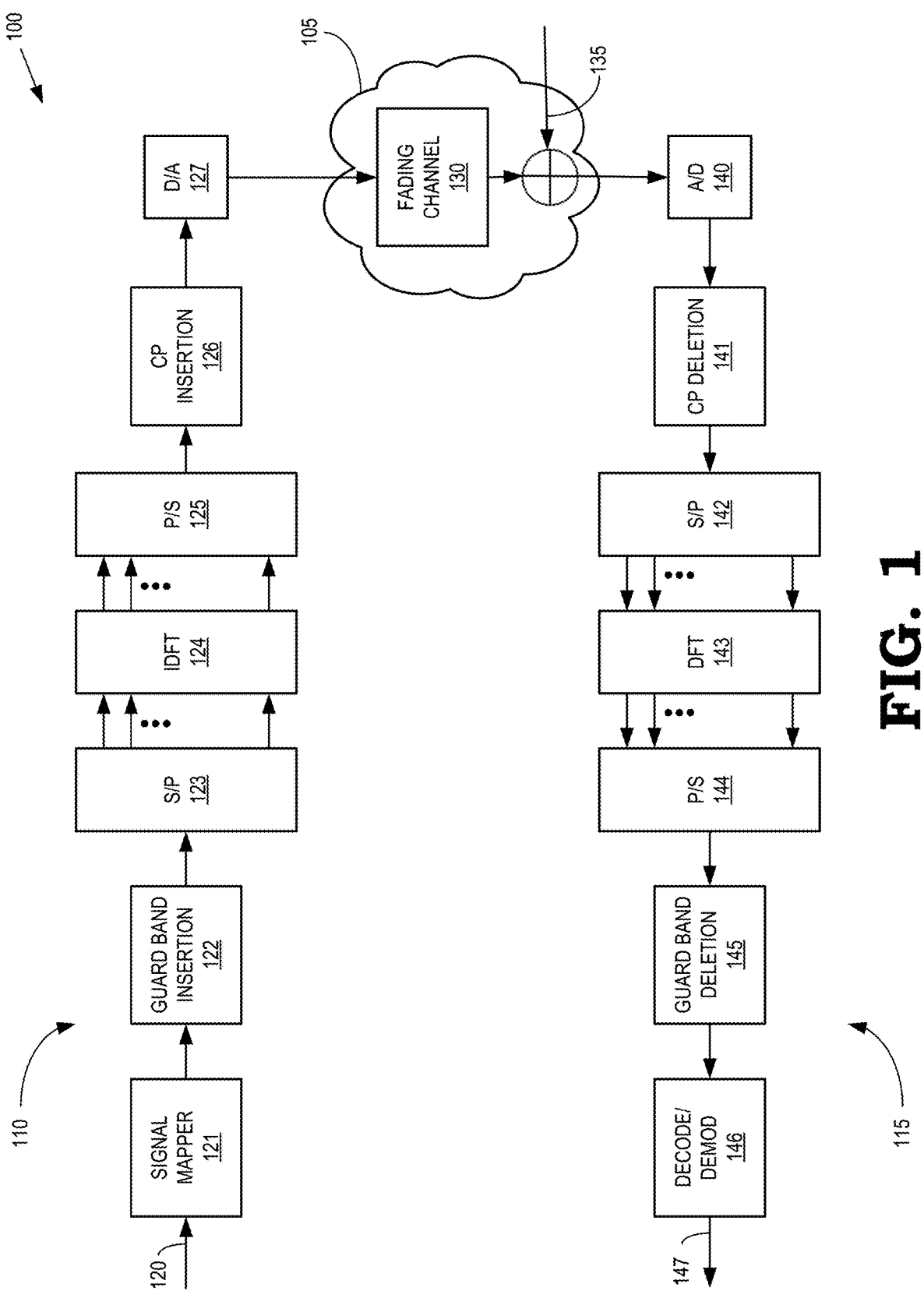
FIG. 1 illustrates a communication system for conveying signals over an air interface using orthogonal frequency division multiplexing (OFDM), according to some embodiments.

Synchronization errors increase interference between the subcarriers of an OFDM system. One type of synchronization error is timing offset, which is the difference between the time when a receiver starts sampling the signal and the time when the OFDM signal arrives at the receiver from the transmitter. A large timing offset can cause ISI and, even if the timing offset is small enough that receiver sampling starts in the cyclic prefix or guard band, the unknown timing offset can introduce phase distortions in the frequency domain signal. Another type of synchronization error is frequency offset, which is the difference between the carrier frequency of the receiver and the carrier frequency of the transmitter. Frequency offsets can be introduced by calibration errors or Doppler shifting due to relative motion of the transmitter and receiver. Frequency offset can cause ICI and, even when the ICI is small, the frequency offset introduces a phase distortion in the time domain signals. These problems are exacerbated in communication systems that convey information over narrower bandwidths or using less reference signal, such as Narrow Band Internet of Things (NB-IoT), because conventional frequency and timing offset estimation techniques are less accurate in these contexts. Conventional offset estimation techniques suffer from large estimation errors in contexts with extremely low signal-to-noise ratios (SNR), such as non-terrestrial networks (NTN).

Reference signals (or pilot signals) are transmitted on a subset of the subcarriers and in a small number of slots. The timing and frequency offsets are estimated using the reference signals. If the estimates are incorrect, the errors affect channel estimates for all slots and subcarriers including those with a reference signal. Thus, channel estimates can be degraded by incorrect estimates of the timing or frequency offsets, or residual timing/frequency offsets that remain after timing/frequency offset estimation based on the reference signals. For example, an incorrect frequency offset estimate (or a residual frequency offset) can induce a phase ramp in the time domain that distorts a channel estimate for a target subframe.

FIGS. 1-12 describe embodiments of systems and techniques for improving channel estimates by accounting for the effects of timing offsets and frequency offsets. For a given estimate of the timing and/or frequency offsets, channel estimates for a target subframe are improved by combining a first channel estimate generated based on reference signals in the target subframe with other channel estimates within a window around the target channel estimate. In some cases, the other channel estimates are generated based on reference signals in a subframe that precedes the target subframe (referred to herein as the preceding channel estimate) and a subframe that succeeds the target subframe (referred to herein as the succeeding channel estimate). The combination is performed based on an estimated frequency offset. The preceding subframe and the succeeding subframe can be chosen to be substantially symmetric about the target subframe or a span of target subframes. As used herein, the phrase "substantially symmetric" implies symmetry within a predetermined number of subframes such as within two subframes in some implementations or within one subframe in other implementations. For example, a pair of broadcast channel subframes can be chosen as the preceding and succeeding subframes for a span of data or control channel subframes on a subcarrier. Subframes including synchronization signals can also be chosen as the preceding or succeeding subframes for a data or control channel subframe. In some cases, the preceding and succeeding subframes are subframes including broadcast channels or synchronization signals that bracket a set of subframes that includes blocks of data or control subframes and one or more other broadcast channels or synchronization signals. The preceding and succeeding subframes can be defined using a sliding window so that each broadcast channel or synchronization signal is chosen as both a preceding subframe and a succeeding subframe for different sets of subframes. The time and frequency offsets can be estimated independently or as part of a joint estimation of the timing offset, frequency, offset, and channel. Alternatively, joint estimation of the timing offset, frequency, offset, and channel can be performed without using the above windowing technique.

Jointly estimating the timing offset, frequency offset, and channel can reduce the interference caused by timing and frequency offsets for signals received over OFDM subcarriers. To perform joint estimation, a set of candidate frequency offsets and candidate timing offsets are chosen or predetermined. Received reference signals are sampled on a subset of the subcarriers. Channel estimates are generated by modifying the reference signals based on the candidate frequency offsets and candidate timing offsets. In some cases, a channel estimate is generated by compensating the reference signals based on a product of the timing offset and the subcarrier spacing, and a product of the frequency offset and the symbol duration. Joint estimates of the timing offset, the frequency offset, and the channel estimate are generated based on the reference signals, the candidate timing offsets, the candidate frequency offsets, and candidate channel estimates that are determined based on the candidate timing and frequency offsets. In some cases, the joint estimates are generated by applying a maximum log likelihood criterion to a difference between the reference signals and corresponding channel decompensations generated based on the candidate channel estimates, the candidate frequency offsets, and the candidate timing offsets. In some cases, the set of candidate frequency offsets and candidate timing offsets are iteratively updated based on the channel estimates, frequency offsets, and timing offsets estimated in a previous iteration.

FIG. 1 illustrates a communication system 100 for conveying signals over an air interface 105 using OFDM, according to some embodiments. Communication system 100 includes a transmitter 110 and a receiver 115 that are configured to exchange signals over the air interface 105. In some embodiments, the transmitter 110 and the receiver 115 are implemented in different wireless communication devices.

The transmitter 110 receives an input stream 120 of bits that are to be encoded and modulated for transmission over the air interface 105. A signal mapper 121 groups the binary information, encodes the information, and then maps the encoded information according to a modulation scheme. In some embodiments, the signal mapper 121 modulates the encoded signals according to quadrature phase shift key (QPSK) modulation. A guard band block 122 inserts a guard band into the modulated data stream. The data stream is provided to a serial-to-parallel (S/P) converter 123 that converts the serial bitstream into a set of parallel bitstreams corresponding to the OFDM subcarriers of the communication system 100. An inverse discrete-time Fourier transform (IDFT) block 124 transforms the parallel data streams into the time domain and the transformed data streams are provided to a parallel-to-serial converter 125, which converts the parallel time domain streams into a serial stream of symbols. Cyclic prefix insertion block 126 inserts a cyclic prefix to reduce or eliminate inter-symbol interference (ISI) and inter-carrier interference (ICI). The duration of the cyclic prefix should be larger than the expected delay spread for the transmitted signal. A digital-to-analog (D/A) converter 127 converts the digital bitstream into an analog signal. In some embodiments, the D/A converter 127 includes filters such as a low pass filter having a bandwidth corresponding to an inverse of a sampling interval used by the D/A converter 127.

Signals generated by the transmitter 110 are transmitted over the air interface 105. In the illustrated embodiment, the air interface 105 is represented as a fading channel 130 and noise 135. The fading channel 130 can be modeled as an impulse response and the noise 135 can be modeled as complex additive white Gaussian noise (AWGN). However, other models can be used to represent the fading channel 130 or the noise 135.

Signals received at the receiver 115 pass through an analog-to-digital converter (A/D) 140 that generates a digital representation of the analog signal received over the air interface 105, e.g., by sampling the analog signal at a predetermined sampling rate. A cyclic prefix deletion block 141 removes the cyclic prefix from the digital signal. An S/P converter 142 converts the serial digital signal into a set of parallel digital signals that correspond to the OFDM subcarriers of the communication system 100. A discrete Fourier transform (DFT) block 143 transforms the data back into the frequency domain and then the parallel frequency domain signals are converted into a serial bitstream at the P/S converter 144. The guard band is removed at the block 145. The block 146 obtains the binary information 147 by demodulating the parallel bitstream and decoding the channel.

Figure 2:
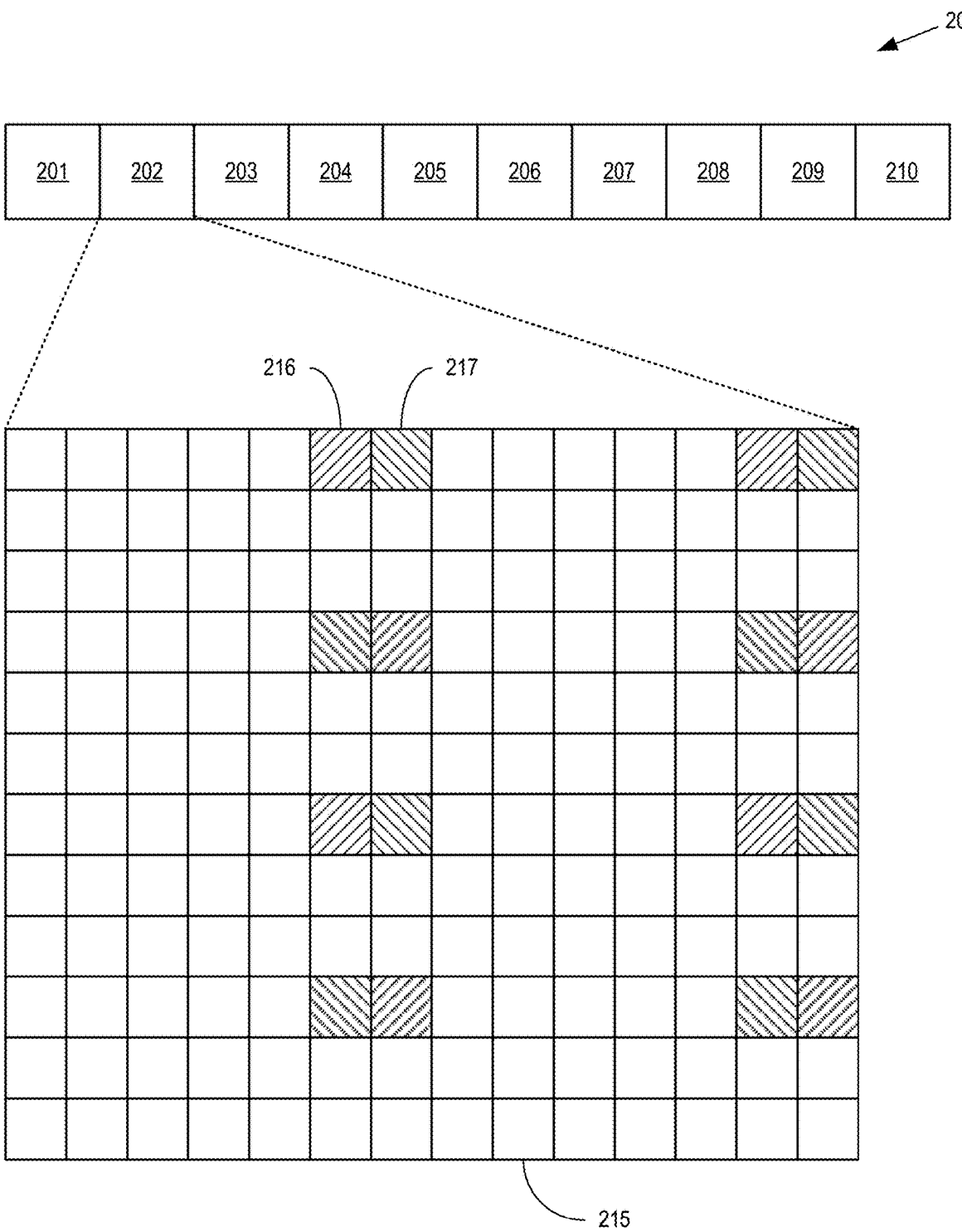
FIG. 2 illustrates a structure of a conventional frame that is used to implement NB-IoT in communication systems such as the communication system shown in FIG. 1, according to some embodiments.

FIG. 2 illustrates a structure of a conventional frame 200 that is used to implement NB-IoT in communication systems such as the communication system 100 shown in FIG. 1, according to some embodiments. Frame 200 represents the structure of frames used in communication systems that operate according to the protocols used to implement NB-IoT. However, other frame structures that use different numbers of subcarriers or time slots are used in other OFDM communication systems such as Fourth Generation (4G) or Fifth Generation (5G) systems that operate according to the protocols and standards defined by the Third Generation Partnership Project (3GPP).

The frame 200 includes subframes 201, 202, 203, 204, 205, 206, 207, 208, 209, 210, which are collectively referred to herein as "the subframes 201-210." The duration of the frame 200 is 10 millisecond (ms) and the duration of each of the subframes 201-210 is 1 ms. Although ten subframes 201-210 are shown in FIG. 2, other numbers of subframes having different durations are used in other embodiments. In communication systems that operate according to NB-IoT, resources of the subframe 201 are reserved for the narrowband physical broadcast channel (NPBCH) that carries the master information block (MIB). Resources of the subframes 202-205 are used to carry the narrowband physical downlink control channel (NPDCCH) or the narrowband physical downlink shared channel (NPDSCH). The NDPCCH slots carry scheduling information for both downlink and uplink channels, as well as acknowledgment information for the uplink data channel, paging indications, and random access response (RAR) scheduling information. The NPDSCH slots carry data from higher layers as well as paging messages, system information, and RAR messages. The subframe 206 carries the narrowband primary synchronization signal and the subframe 210 carries the narrowband secondary synchronization signal in alternate frames.

Each of the subframes 201-210 includes resource elements 215 (only one indicated by a reference numeral in the interest of clarity) for transmitting information over the uplink or downlink. In systems that operate according to NB-IoT, the resource elements 215 are distributed over twelve subcarriers or subchannels (in the vertical direction in FIG. 2) and fourteen symbols (in the horizontal direction in FIG. 2). Different numbers of subcarriers or symbols are used in other OFDM protocols, such as 4G or 5G. Cross-hatching indicates the narrowband reference signals that are transmitted to provide phase references for the demodulation of the downlink channels. Different symbols can be used to transmit the reference signals for different ports. For example, the first crosshatching 216 indicates symbols that are used to transmit reference signals in the first port and the second cross-hatching 217 indicates symbols that are used to transmit reference signals in the second port.

Timing and frequency offsets are estimated using the reference signals in the subframes 201-210. In the illustrated embodiment, the timing and frequency offsets are estimated using some or all the reference signals included in the NPBCH/NPSS/NSSS symbols in the subframes 201, 206, and (in alternate frames) 210. A joint timing offset, frequency offset, and channel estimation technique is described herein with regard to FIGS. 10 and 11. If the offset estimates are incorrect or residual offsets remain after correction based on the estimates, channel estimates for all slots and subcarriers including those with a reference signal are affected. For example, channel estimates can be degraded by incorrect estimates of the timing or frequency offsets or residual timing/frequency offsets that remain after timing/frequency offset estimation based on the reference signals.

Figure 3:
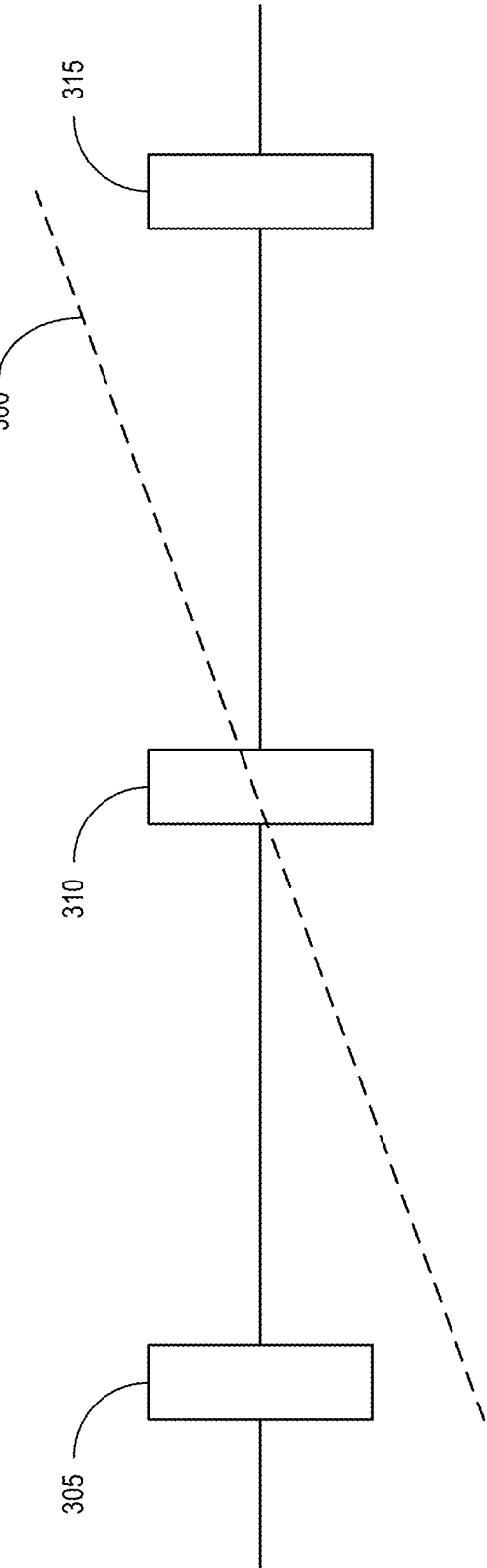
FIG. 3 illustrates a phase ramp that is induced in the time domain by a frequency offset estimate or a residual frequency offset due to an incorrect frequency offset estimate or a residual frequency offset, according to some embodiments.

FIG. 3 illustrates a phase ramp 300 that is induced in the time domain by a frequency offset estimate or a residual frequency offset due to an incorrect frequency offset estimate or a residual frequency offset, according to some embodiments. The horizontal axis in FIG. 3 indicates successive subframes 305, 310, 315 in the time domain. The time domain phase ramp 300 distorts channel estimates for the target subframe 310.

The channel distortion in the target subframe 310 is reduced or eliminated by averaging over channel estimates of other subframes such as the preceding subframe 305 and the succeeding subframe 315. In the illustrated embodiment, the subframes 305, 315 are symmetric about the target subframe 310 so the time difference between the subframe 305 and the target subframe 310 is the same as the time difference between the subframe 315 and the target subframe 310. The same amplitude of phase distortion is therefore introduced to the channel by the subframes 305, 315. For example, if three pilot signals in the subframes 305, 310, 315 are used as the reference signals for the channel estimates, the raw channel estimates are given by:

$$y_0 = h + n_0$$
$$y_{-1} = he^{-j\varphi_{off}} + n_{-1}$$
$$y_{+1} = he^{+j\varphi_{off}} + n_{+1}$$

where the subscripts $0, -1, +1$ indicate the target subframe, preceding subframe, and succeeding subframe, respectively, and $\varphi_{off}$ is the phase distortion introduced by the incorrect or residual frequency offset. Averaging the channel estimates, e.g., according to equation (3), generates the channel estimate:

$$\hat{h} = \frac{1}{3}(y_{-1} + y_0 + y_{+1}) = \frac{1}{3}h(1 + \varphi_{0ff}) + \frac{1}{3}(n_{-1} + n_0 + n_{+1})$$

Thus, when channel averaging is performed using symmetric subframes 305, 325, the phase distortion from the frequency offset $\varphi_{off}$ only scales the channel estimate and does not change the phase of the channel. when $\varphi_{off} \neq 0$.

Demodulating the signal using QPSK modulation does not require a very accurate estimate of the channel amplitude because channel scaling does not introduce phase ambiguity in the QPSK demodulation. QPSK is the only modulation format implemented in NB-IoT and so, in embodiments that implement NB-IoT, symmetrical windowing improves the channel estimation and demodulation performance, as well as reducing the impact of any residual frequency offset or errors in the frequency offset estimation. Other windowing options, which may be substantially symmetric or asymmetric, are used in other embodiments, e.g., to improve channel estimates at target subframes or in a range or span of target subframes, as discussed herein.

Figure 4:
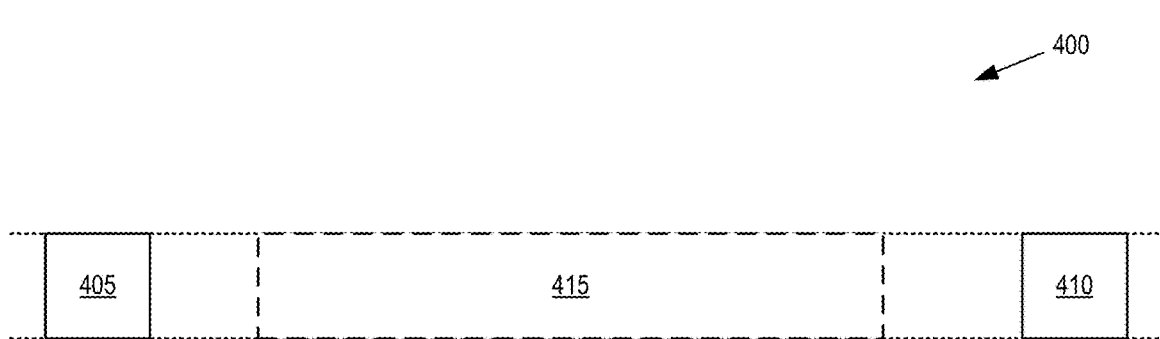
FIG. 4 illustrates subframe windowing for channel estimation for subframes of a channel represented in the time domain, according to some embodiments.

FIG. 4 illustrates subframe windowing for channel estimation for subframes of a channel 400 represented in the time domain, according to some embodiments. The horizontal axis in FIG. 4 indicates successive signaling subframes 405, 410 that bracket or are substantially symmetric about a span 415 of multiple subframes in the time domain. In the illustrated embodiment, the signaling subframes 405, 410 are used to transmit a broadcast channel or a primary synchronization signal. For example, the signaling subframes 405, 410 can be used to transmit a NPBCH subframe or a NPSS subframe. A corresponding physical downlink subframe is transmitted within the span 415 of physical downlink subframes. Detected signals in the physical downlink subframes 405, 410, such as the system information block (SIB), can be used as reference signals for channel estimation of the system information block (SIB), NPDCCH or NPDSCH subframes because the NPBCH and NPSS subframes can be decoded and demodulated prior to detection of the SIB, NPDCCH, or NPDSCH subframes.

In NB-IoT, the NPBCH is transmitted in subframe 0 and the NPSS is transmitted in subframe 5, so these subframes are substantially symmetric about the span 415. They are therefore good candidates to form a channel estimation window. The span 415 of the physical downlink subframes in the time domain depends on a repetition setting. The averaging window for the physical downlink subframes in the span 415 can include a nearest NPBCH or NPSS in the subframe 405 that precedes the first physical downlink subframe in the span 415 and a nearest NPBCH or NPSS in the subframe 410 that succeeds the last physical downlink subframe in the span 415. In addition to the signals in the subframes 405, 410, reference signals in the physical downlink subframes of the span 415 can also be used as pilot symbols in the channel estimation process. Secondary synchronization signals can also be used, as discussed herein.

Figure 5:
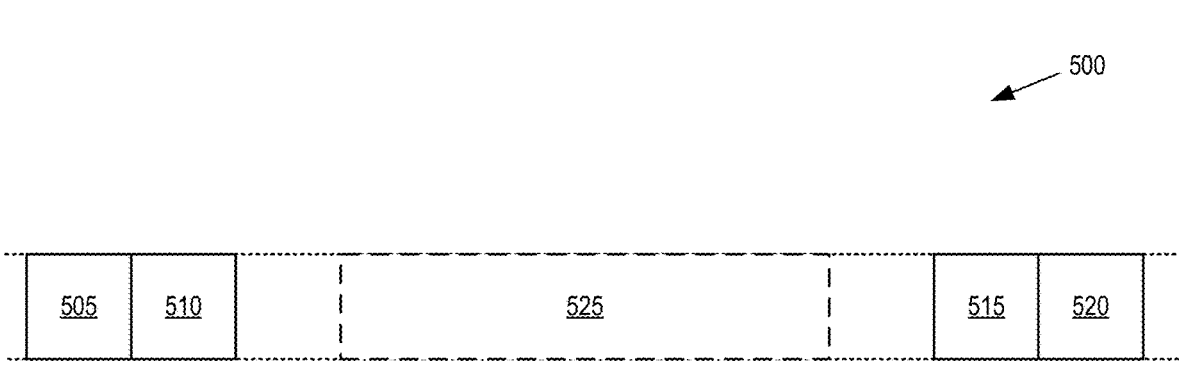
FIG. 5 illustrates subframe windowing that includes secondary synchronization signals for channel estimation for subframes of a channel represented in the time domain, according to some embodiments.

FIG. 5 illustrates subframe windowing that includes secondary synchronization signals for channel estimation for subframes of a channel 500 represented in the time domain, according to some embodiments. The vertical axis in FIG. 5 indicates successive signaling subframes 505, 510, 515, 520 that bracket or are substantially symmetric about a span 525 of multiple subframes in the time domain. In the illustrated embodiment, the signaling subframes 505, 515 are used to transmit secondary synchronization signals (NSSS) and the signaling subframes 510, 520 are used to transmit a broadcast channel or primary synchronization signal. For example, the signaling subframes 505, 515 can be used to transmit an NSSS subframe and a corresponding physical downlink subframe that is within the span 525 of physical downlink subframes. The signaling subframes 510, 520 can be used to transmit a NPBCH subframe or a NPSS subframe for a corresponding physical downlink subframe that is within the span 525. The signals in the NSSS subframes can be used as reference signals for channel estimation in addition to, or independently of, the signals in the NPBCH or NPSS subframes. In some embodiments, reference signals in other subframes that precede or succeed the span 525, as well as reference signals within the span 525, are used to improve the performance of the channel estimate. Including additional reference signals from other subframes can be particularly beneficial for the channel estimate when the repetition number is small, e.g., four.

Figure 6:
FIG. 6 illustrates a set of subframe windows that are used for channel estimation of a channel represented in the time domain, according to some embodiments.
Figure 6:
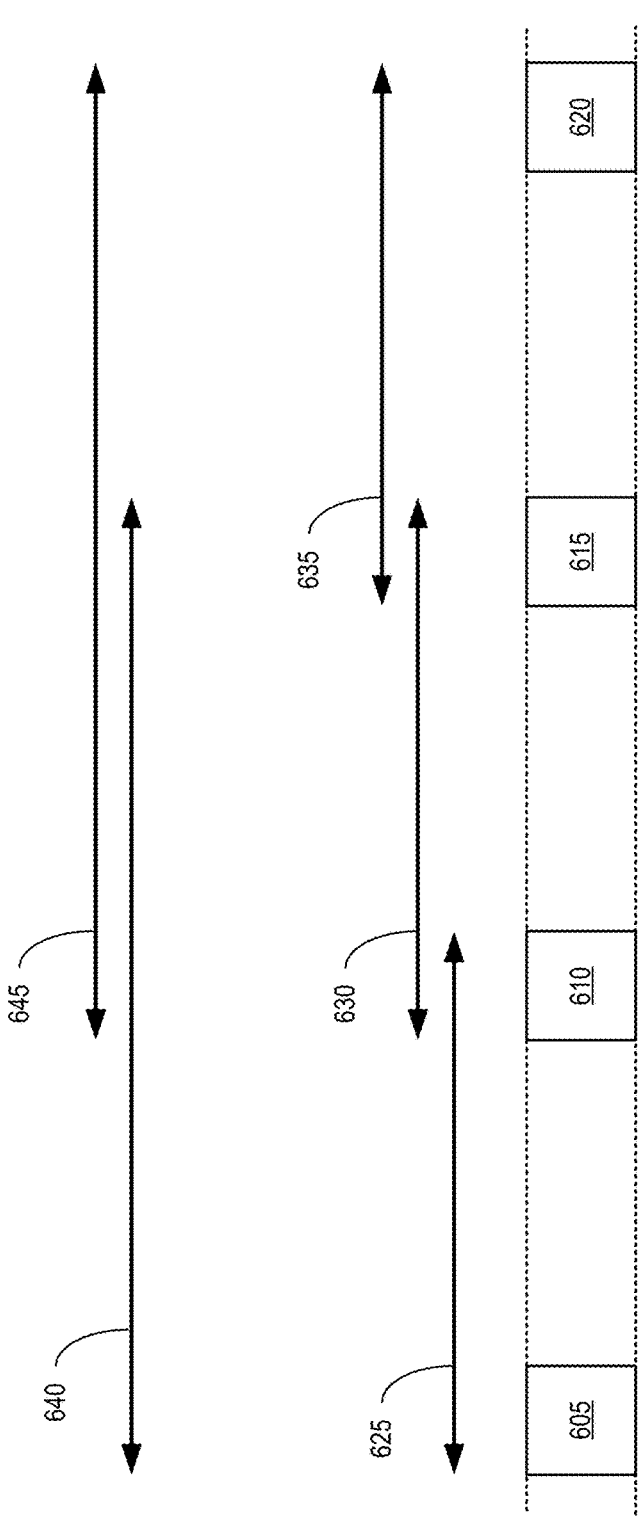

FIG. 6 illustrates a set of subframe windows that are used for channel estimation of a channel 600 represented in the time domain, according to some embodiments. The channel includes subframes 605, 610, 615, 620 that include broadcast channels or synchronization signals. In the illustrated embodiment, half frames including five subframes plus one additional subframe (such as the NPBCH or NPSS in the first subframe of the next half frame) are defined as blocks 625, 630, 635. Channel estimation windows for the blocks 625, 630, 635 begin with one of the (preceding) subframes 605, 610, 615, 620 and end with one of the (succeeding) subframes 605, 610, 615, 620. For example, the block 625 begins with the subframe 605 and ends with the subframe 610 and includes a total of six subframes. Signals in the subframes 605, 610, as well as reference signals in the other subframes, can be used to perform the channel estimation.

Other sets of subframes can be used to define the subframe windows. In some embodiments, as discussed herein, signals in multiple preceding subframes (e.g., subframes that include NPSS and NSSS signals) and signals in multiple succeeding subframes are used as reference signals for the channel estimation technique. Larger or smaller subframe windows are used in other embodiments. For example, the windows 640, 645 encompass a full frame. For another example, the window 650 encompasses one and a half frames. Different windows may perform better in different circumstances such as larger or smaller frequency offsets and different trade-offs between using channel estimation for de-noising or frequency offset impairment.

Figure 7:
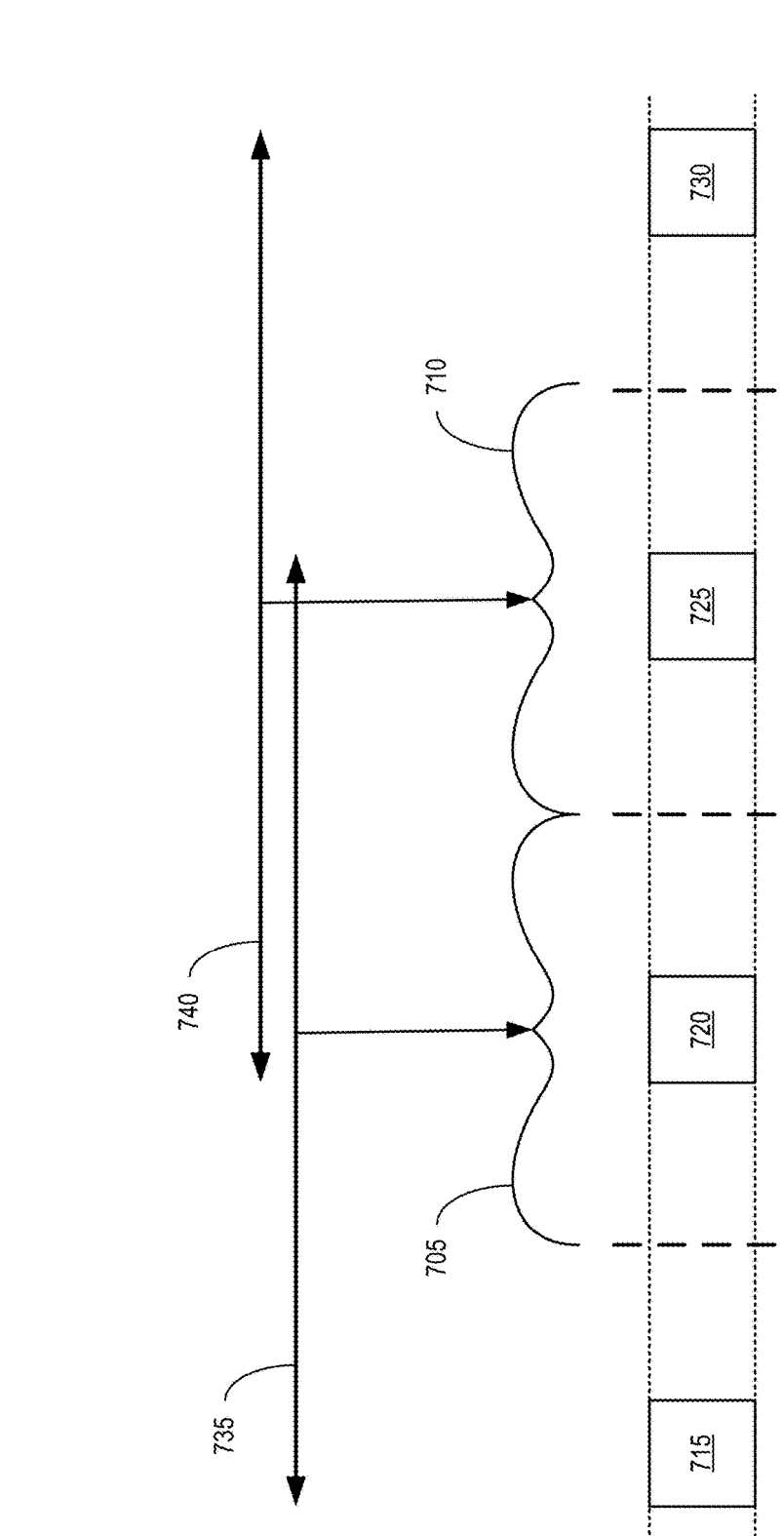
FIG. 7 illustrates sliding subframe windows for channel estimation of a channel over spans that encompass broadcast or signaling channels, according to some embodiments.

FIG. 7 illustrates sliding subframe windows for channel estimation of a channel 700 over spans 705, 710 that encompass broadcast or signaling channels, according to some embodiments. The illustrated portion of the channel 700 includes subframes 715, 720, 725, 730 that include broadcast or signaling channels such as the NPBCH, NPSS, or NSSS channels. The subframes used for channel estimation of the spans 705, 710 are selected or chosen using a sliding window. In the illustrated embodiment, the channel windows 735, 740 are formed with subframes based equally (or substantially symmetrically) on either side of an intervening broadcast or signaling subframe. The channel window 735 is formed using the subframes 715, 725, which are spaced substantially symmetrically about the subframe 720. Reference signals in the channel window 735 are used to estimate channels for the subframes in the span 705. The channel window 740 is formed using the subframes 720, 730, which are spaced substantially symmetrically about the subframe 725. Reference signals in the channel window 740 are used to estimate channels for the subframes in the span 710.

Figure 8:
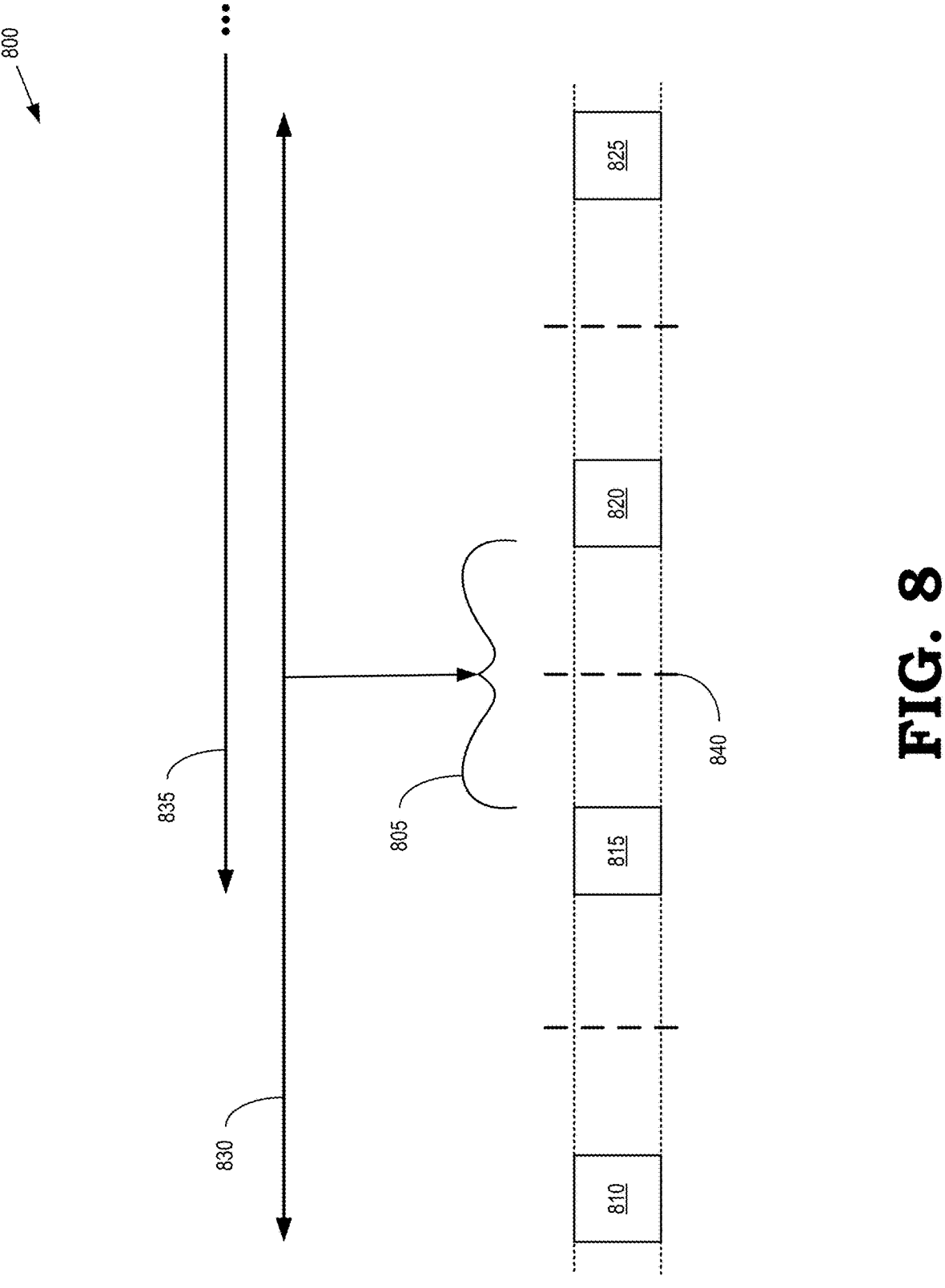
FIG. 8 illustrates sliding subframe windows for channel estimation of a channel over a span that encompasses multiple broadcast or signaling channels in different sub-frames, according to some embodiments.

FIG. 8 illustrates sliding subframe windows for channel estimation of a channel 800 over a span 805 that encompasses multiple broadcast or signaling channels in different subframes, according to some embodiments. The illustrated portion of the channel 800 includes subframes 810, 815, 820, 825 that include broadcast or signaling channels such as the NPBCH, NPSS, or NSSS channels. In the illustrated embodiment, the channel windows 830, 835 are formed with subframes based equally (or substantially symmetrically) on either side of multiple intervening broadcast or signaling subframes. The channel window 830 is formed using the subframes 810, 815, 820, 825, which are spaced substantially symmetrically about a subframe that is equidistant between the subframes 815, 820, as indicated by the line 840. Reference signals in the channel window 830 are used to estimate channels for the subframes in the span 805. The channel window 830 slides (i.e., advances along the time domain axis) to form the channel window 835.

Figure 9:
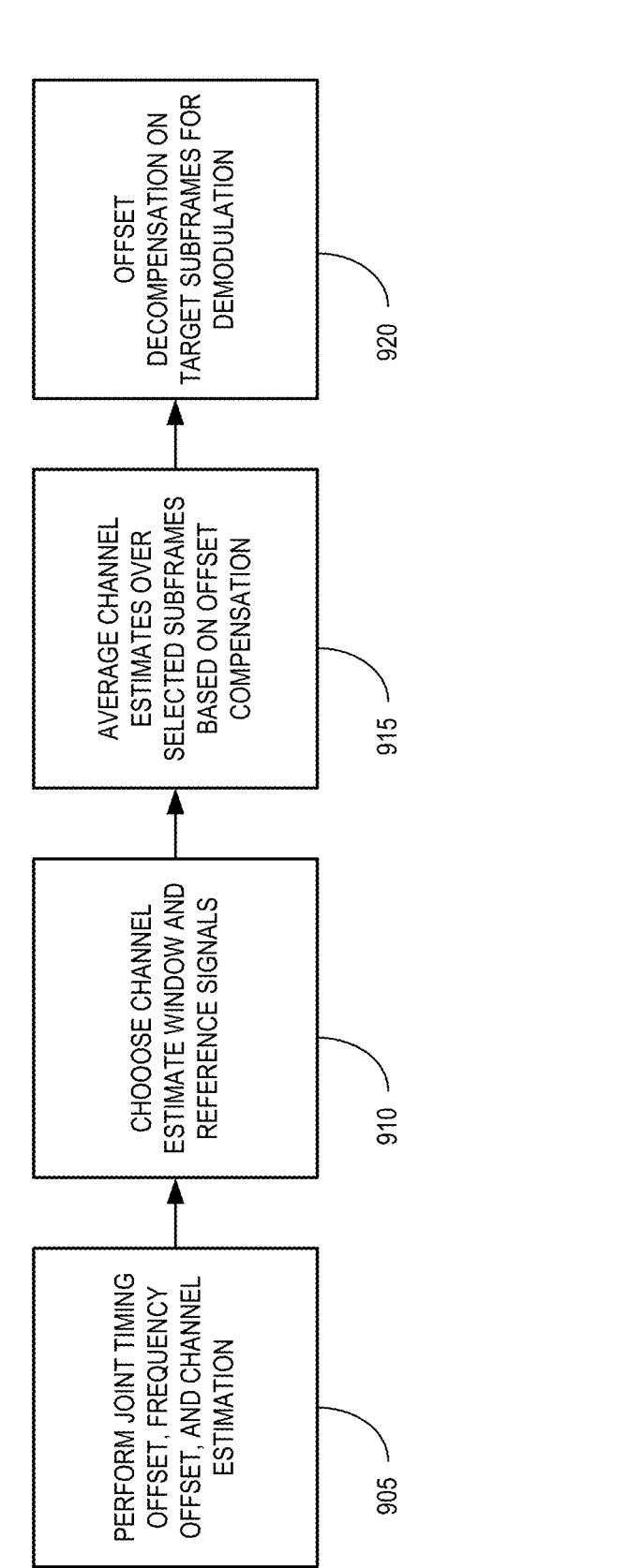
FIG. 9 is a flow diagram illustrating a two-stage method of compensating for distortions caused by timing and frequency offset errors or residual timing and frequency offsets, according to some embodiments.

FIG. 9 is a flow diagram illustrating a two-stage method 900 of compensating for distortions caused by timing and frequency offset errors or residual timing and frequency offsets, according to some embodiments. The method 900 is implemented in some embodiments of the communication system 100 shown in FIG. 1 and the device 1200 shown in FIG. 12.

In some embodiments, at block 905, timing or frequency offsets are estimated. The method 900 compensates for errors or residual offsets and can be used in embodiments that do not perform any timing or frequency offset measurement. In some embodiments of the method 900, a joint timing offset, frequency offset, and channel estimation (e.g., as in the discussion of FIGS. 10 and 11) is performed in the block 905.

At block 910, a channel estimate window and corresponding reference signals are chosen or selected. In some embodiments, the channel estimate window or reference signals are chosen as in the discussion of FIGS. 3-8.

At block 915, raw channel estimates are performed for subframes that are selected based on the offset compensation. In some embodiments, the raw channel estimates are performed using reference signals that are chosen as in the discussion of FIGS. 3-8.

At block 920, the raw channel estimates are combined and used to perform offset decompensation on one or more target subframes for demodulation of the target subframes. In one embodiment, the raw channel estimates are averaged. However, in other embodiments the raw channel estimates can be combined using other statistical techniques such as performing a weighted combination of the raw channel estimates.

Conventional methods for frequency offset and timing offset estimation do not work well in NB-IoT due to the relatively small (narrow) bandwidth available for uplink and downlink communication, e.g., relative to the bandwidth available for Fifth Generation (5G) communication as defined by the Third Generation Partnership Project (3GPP). Furthermore, the amount of available reference signal is lower for NB-IoT because NB-IoT uses fewer subcarriers and orthogonal frequencies, e.g., relative to 5G. In an extremely low signal-to-noise (SNR) regime, e.g., in non-terrestrial network (NTN) transmissions, the conventional techniques can produce large frequency and timing offset estimation errors. However, the communication channels in NB-IoT and NTN communications are typically stable over relatively long intervals, e.g., relative to 5G. In some cases, the channel is substantially static and unchanging over the relevant time intervals for channel estimation. Joint timing offset, frequency offset, and channel estimation techniques are efficient for channels that are stable or static, even in a very low SNR region.

Figure 10:
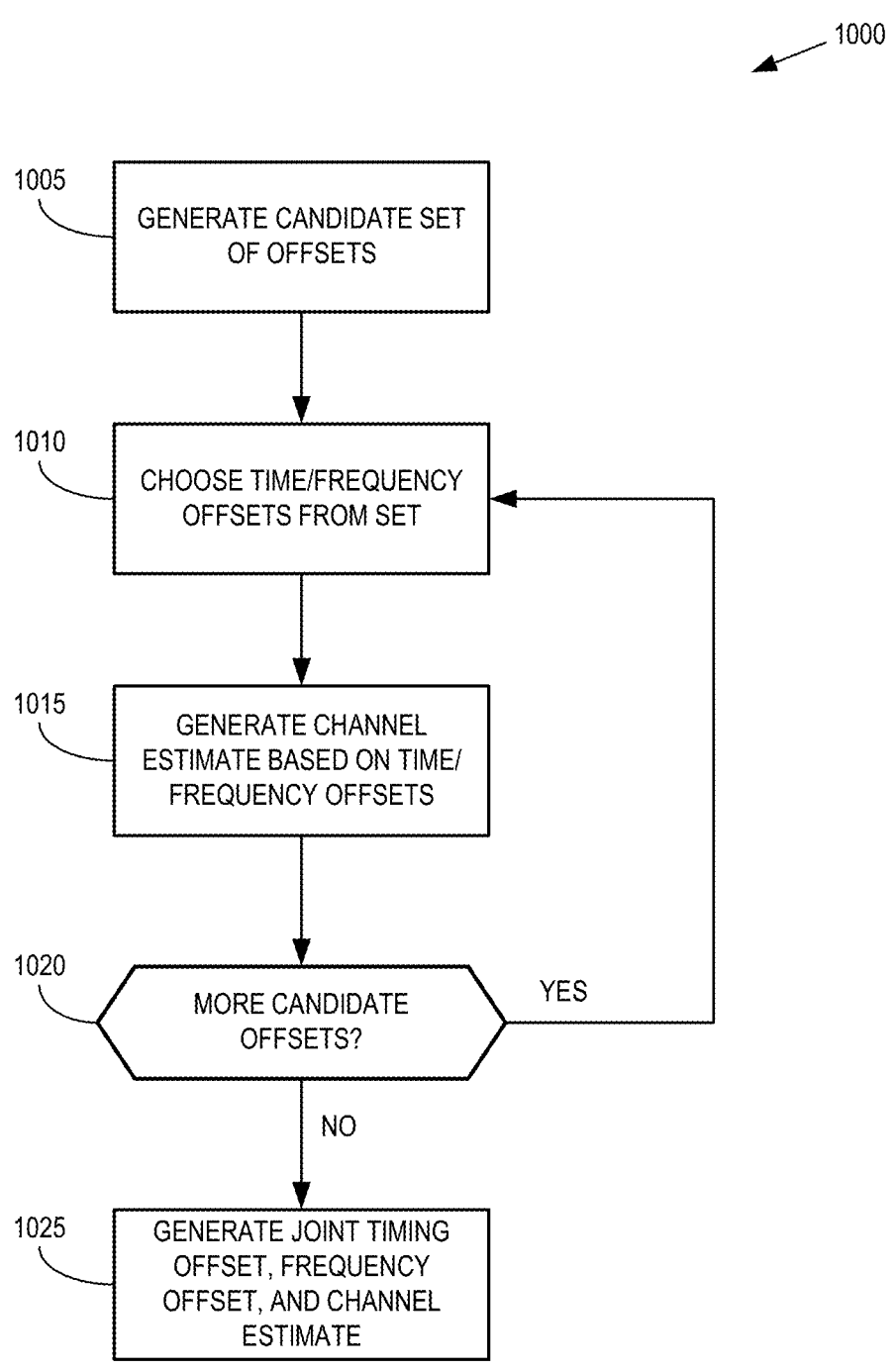
FIG. 10 illustrates a method of performing joint timing offset, frequency offset, and channel estimation, according to some embodiments.

FIG. 10 illustrates a method 1000 of performing joint timing offset, frequency offset, and channel estimation, according to some embodiments. The method 1000 is implemented in some embodiments of the communication system 100 shown in FIG. 1. Some embodiments of the method 1000 are used to perform joint timing offset, frequency offset, and channel estimation in communication systems that operate according to the protocols that define NB-IoT.

At block 1005, the receiving device, such as a user equipment, generates a candidate set of hypothesis offsets. For example, the receiving device can generate a hypothesis $(f_o, t_o)$ candidate set $\{(f_o^{(j)}, t_o^{(j)})\}$.

At block 1010, the receiving device chooses a timing offset $t_o$ and frequency offset $f_o$, from the candidate set.

Given the timing offset to and frequency offset $f_o$, the received i-th signal at the $k_i$-th subcarrier and the $l_i$th OFDM symbol $(r_i)$ is approximated in the frequency domain using a fast Fourier transformation (FFT):

$$r_i = h x_i e^{j2\pi(-k_i f_{sc} t_o + l_i T_s f_o)} + n_i \qquad (1)$$

where h is the channel which remains constant in the estimation window, $x_i$ is the transmit data or pilot symbol (reference signal), $f_{sc}$ is the subcarrier spacing, $T_s$ is the OFDM symbol duration, and $n_i$ is the white noise with variance $\sigma^2$.

For a resource element including the reference signal, the received signal is multiplied with conjugated pilot symbol (assumed to be unit power) as $$y_i = x_i^* r_i = h e^{j2\pi(-k_i f_{sc} t_o + l_i T_s f_o)} + n_i' \qquad (2)$$

It can be seen that without the timing and frequency offsets, $y_i$ is a raw channel estimate of the $(k_i, l_i)$-th resource element. A good estimation of h can be obtained by combining or averaging the channel estimates over a set of N signals $y_i$:

$$\hat{h} = \frac{1}{N} \sum_i y_i \qquad (3)$$

However, when there are timing and frequency offsets, a phase distortion is introduced to the channel h. If the timing and frequency offsets are small, the channel can be estimated by averaging within a limited bandwidth (e.g., over a small number of adjacent pilot subcarriers) and a small number of subframes. However, for extremely low SNR, more reference signals are needed to increase the SNR to combat the noise and obtain a fairly accurate channel estimate. Thus, there is a trade-off between considering larger numbers of reference signals to increase SNR and considering smaller numbers of reference signals to reduce the phase distortion introduced by timing and frequency offsets.

At block 1015, the receiving device generates a channel estimate based on the candidate timing and frequency offsets. For each candidate $(f_o^{(j)}, t_o^{(j)})$, the receiving device performs timing and frequency offset compensation of the signal $y_i$ as:

$$\tilde{y}_i = \left(e^{j2\pi(-k_i f_{sc} t_o + l_i T_s f_o)}\right)^* y_i = h + \tilde{n}_i \qquad (4)$$

In some embodiments, the receiving device performs the channel decompensation as:

$$h^{(j)} e^{j2\pi\left(-k_i f_{sc} t_o^{(j)} + l_i T_s f_o^{(j)}\right)}$$

The receiving device then generates channel estimate $h^{(j)}$ as:

$$\hat{h} = \frac{1}{N} \sum_{i=1}^{N} \tilde{y}_i \qquad (5)$$

At block 1020, the receiving device determines whether there are additional candidate offsets in the set of candidate offsets. If so, the method 1000 flows back to block 1010 and new timing and frequency offsets are chosen or selected. If not, the method 1000 flows to the block 1025 to perform the joint timing offset, frequency offset, and channel estimation.

At block 1025, the receiving device performs a joint timing offset, frequency offset, and channel estimation based on the channel estimates generated in the block 1015. In the illustrated embodiment, the noise $n'_i$ is represented as i.i.d. Gaussian noise with variance $\sigma^2$. The log likelihood function of signal vectors $y = [y_1, \ldots, y_i, \ldots, y_N]^T$, where $[\ ]^T$ denotes transpose, is given as:

$$\Lambda(f_o, t_o, h) = \log\log f(y \mid f_o, t_o, h) = \sum_i \frac{-\left|y_i - h e^{j2\pi(-k_i f_{sc} t_o + l_i T_s f_o)}\right|^2}{\sigma^2} \qquad (6)$$

where some unnecessary coefficient terms were omitted in the interest of clarity.

To maximize the log-likelihood (ML), the estimation criterion is obtained as $$\Lambda(f_o, t_o, h) \rightarrow \frac{-\left|y_i - he^{j2\pi(-k_i f_{sc} t_o + l_i T_s f_o)}\right|^2}{\sigma^2} \qquad (7)$$

A min-distance or min MSE criterion corresponding to the maximized log-likelihood estimation criterion set forth in equation (7) is:

$$\sum_i \left|y_i - he^{j2\pi(-k_i f_{sc} t_o + l_i T_s f_o)}\right|^2 \qquad (8)$$

The joint timing offset, frequency offset, and channel estimates are then determined according to the criterion:

$$\left(\hat{h}, \hat{f}_o, \hat{t}_o\right) = \sum_i \left|y_i - h^{(j)} e^{j2\pi\left(-k_i f_{sc} t_o^{(j)} + l_i T_s f_o^{(j)}\right)}\right|^2 \qquad (9)$$

In some embodiments, the method 1000 is applied to joint frequency offset and channel estimation by removing the $t_o$ hypothesis in the candidate set and set $t_o=0$ in the procedures. Joint timing offset and channel estimation can also be performed by removing the $f_o$ hypothesis in the candidate set and set $f_o=0$.

Within a particular range of timing offsets and frequency offsets, the granularity of the candidate timing offsets and frequency offsets in the hypothesis set affects the performance of the estimation generated by the method 1000. Higher granularity typically produces better performance, but at the cost of higher complexity. In some embodiments, the complexity can be reduced using an iterative technique.

Figure 11:
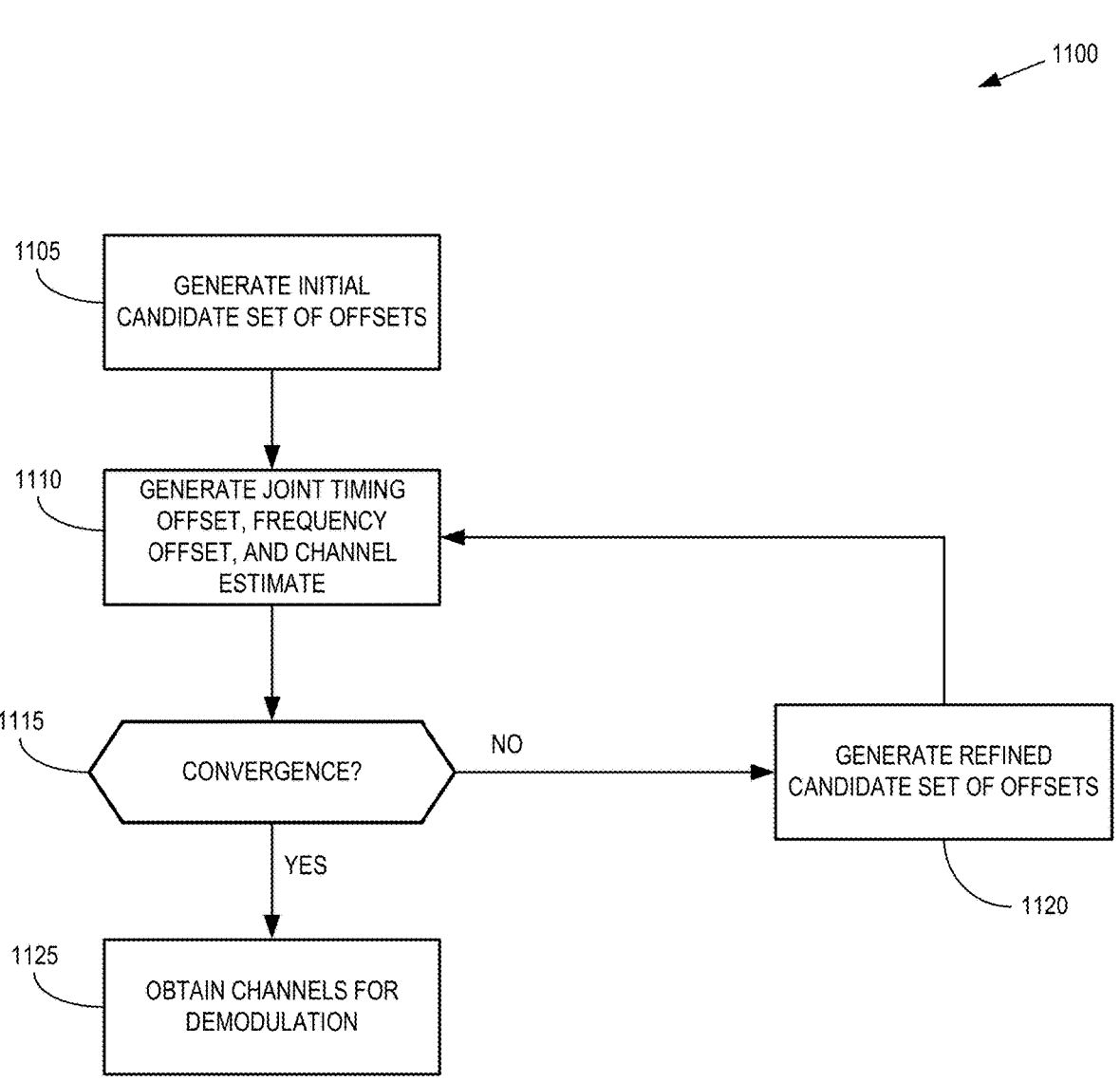
FIG. 11 illustrates a method of iterative joint timing offset, frequency offset, and channel estimation, according to some embodiments.

FIG. 11 illustrates a method 1100 of iterative joint timing offset, frequency offset, and channel estimation, according to some embodiments. The method 1100 is implemented in some embodiments of the communication system 100 shown in FIG. 1. Some embodiments of the method 1100 are used to perform joint timing offset, frequency offset, and channel estimation in communication systems that operate according to the protocols that define NB-IoT.

At block 1105, the receiving device, such as user equipment, generates an initial candidate set of offsets. For example, as discussed herein, the receiving device can generate a hypothesis $(f_o, t_o)$ candidate set $\{(f_o^{(j)}, t_o^{(j)})\}$. The initial candidate set of offsets in frequency for the are selected at an initial level of granularity in time for the timing offset and frequency offset.

At block 1110, the receiving device performs joint estimation of the timing offset, the frequency offset, and channel estimates. In the illustrated embodiment, the receiving device performs the joint estimation as in the discussion of FIG. 10.

At decision block 1115, the receiving device determines whether the iterative joint timing offset, frequency offset, and channel estimation algorithm has converged. Convergence criteria can include completing a predetermined number of iterations, reaching a predetermined granularity of the timing offset, reaching a predetermined granularity of the frequency offset, the amplitude of changes in the channel estimate between successive iterations falling below a threshold, combinations of these criteria, or other convergence criteria. If the receiving device determines that the iterative procedure has not converged, the method 1100 flows to the block 1120. If the receiving device determines that the iterative procedure has converged, the method 1100 flows to block 1125.

At block 1120, the receiving device generates a refined candidate set of offsets. In one embodiment, the refined candidate set is determined based on the timing offset and frequency offset determined at block 1110. For example, the determined timing and frequency offsets can be selected as the central offsets in a distribution of offsets. Other offsets in the distribution are selected based on an updated granularity that is more highly granular than the granularity of the previous iteration. The method 1100 then flows back to block 1110.

At block 1125, the receiving device obtains the channels of the air interface for demodulation of received signals over the subcarriers. In one embodiment, the receiving device performs the decompensation based on the final estimated $(\hat{h}, \hat{f}_o, \hat{t}_o)$, to obtain the channel for each data resource element for demodulation.

$$\hat{h}_i(k_i, l_i) = \hat{h} e^{j2\pi\left(-k_i f_{sc} \hat{t}_o + l_i T_s \hat{f}_o\right)} \qquad (10)$$

Figure 12:
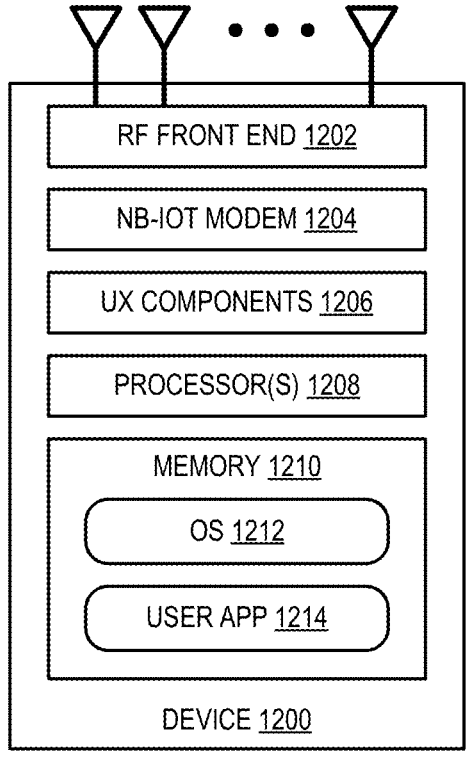
FIG. 12 illustrates a device that compensates for timing and frequency offsets using channel windowing and, in some cases, joint timing offset, frequency offset, and channel estimation, according to some embodiments.

FIG. 12 illustrates a device 1200 that compensates for timing and frequency offsets using channel windowing and, in some cases joint timing offset, frequency offset, and channel estimation, according to some embodiments. The device 1200 is implemented in some embodiments of the communication system 100 shown in FIG. 1. Some embodiments of the device 1200 are configured to implement the method 900 shown in FIG. 9, the method 1000 shown in FIG. 10, or the method 1100 shown in FIG. 11.

The device 1200 includes a front-end 1202 that supports wireless communication over an air interface via a set of antennas. The front-end 1202 receives signals representing a modulated bitstream from a modem 1204. In the illustrated embodiment, the modem 1204 operates according to the standards and protocols used to implement NB-IoT. The device 1200 also includes one or more user experience (UX) components 1206 and one or more processors 1208 that execute instructions for transmitting and receiving information over the air interface, as well as other operations. The device 1200 further includes one or more memory elements 1210. In the illustrated embodiment, the memory elements 1210 store information representing an operating system 1212 that is executed by the one or more processors 1208. The memory elements 1210 also store information representing one or more user applications 1214 such as instructions that are executed by the one or more processors 1208 to implement the functionality of the user applications 1214.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectro-mechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
receiving, at a receiver device from a transmitter device, signals in subframes on subcarriers having orthogonal frequencies, wherein a subset of the subframes comprise reference signals;
generating a first channel estimate for a target subframe based on at least one reference signal in the target subframe;
generating at least one second channel estimate for at least one other subframe based on at least one reference signal in the at least one other subframe; and combining the first channel estimate and the at least one second channel estimate based on a frequency offset between the receiver and the transmitter to form a channel estimate of the target subframe.

2. The method of claim 1, wherein generating the at least one second channel estimate comprises generating a preceding channel estimate based on reference signals in a subframe that precedes the target subframe and a succeeding channel estimate based on reference signals in a subframe that succeeds the target subframe.

3. The method of claim 2, wherein the preceding subframe and the succeeding subframe are substantially symmetric about the target subframe or a span of target subframes.

4. The method of claim 2, wherein the preceding subframe and the succeeding subframe are broadcast channel subframes and the target subframe is a data channel subframe or a control channel subframe.

5. The method of claim 2, wherein the preceding subframe and the succeeding subframe comprise synchronization signals for a data channel subframe or a control channel subframe.

6. The method of claim 2, wherein the preceding subframe and the succeeding subframe bracket a set of subframes that includes blocks of data channel subframes or control channel subframes and at least one broadcast channel or synchronization signal.

7. The method of claim 6, wherein the preceding subframe and the succeeding subframe are defined by a sliding window so that each broadcast channel or synchronization signal is chosen as both the preceding subframe and the succeeding subframe for different target subframes.

8. The method of claim 1, further comprising:
jointly estimating a timing offset, the frequency offset, and a channel of the target subframe.

9. The method of claim 8, wherein jointly estimating the timing offset, the frequency offset, and the channel comprises:
generating a candidate set of timing offsets and frequency offsets;
generating channel estimates based on the candidate set of timing offsets and frequency offsets; and
performing the joint estimation of the timing offset, frequency offset, and channel based on the candidate set and the corresponding channel estimates.

10. A wireless communication device comprising:
a receiver configured to receive signals from a transmitter in subframes on subcarriers having orthogonal frequencies; wherein a subset of the subframes comprises reference signals;
a memory configured to store data representing the signals; and
a processor configured to execute instructions stored by the memory to:
generate a first channel estimate for a target subframe based on at least one reference signal in the target subframe;
generate at least one second channel estimate for at least one other subframe based on at least one reference signal in the at least one other subframe; and
combine the first channel estimate and the at least one second channel estimate based on a frequency offset between the receiver and the transmitter to form a channel estimate of the target subframe.

11. The wireless communication device of claim 10, wherein the processor is further configured to generate a preceding channel estimate based on reference signals in a subframe that precedes the target subframe and a succeeding channel estimate based on reference signals in a subframe that succeeds the target subframe and to combine the first channel estimate, the preceding channel estimate, and the succeeding channel estimate based on the frequency offset to form the channel estimate of the target subframe.

12. The wireless communication device of claim 11, wherein the preceding subframe and the succeeding subframe are substantially symmetric about the target subframe or a span of target subframes.

13. The wireless communication device of claim 11, wherein the preceding subframe and the succeeding subframe are broadcast channel subframes and the target subframe is a data channel subframe or a control channel subframe.

14. The wireless communication device of claim 11, wherein the preceding subframe and the succeeding subframe comprise synchronization signals for a data channel subframe or a control channel subframe.

15. The wireless communication device of claim 11, wherein the preceding subframe and the succeeding subframe bracket a set of subframes that includes blocks of data channel subframes or control channel subframes and at least one broadcast channel or synchronization signal.

16. The wireless communication device of claim 15, wherein the preceding subframe and the succeeding subframe are defined by a sliding window so that each broadcast channel or synchronization signal is chosen as both the preceding subframe and the succeeding subframe for different target subframes.

17. The wireless communication device of claim 10, wherein the processor is further configured to:

jointly estimate a timing offset, the frequency offset, and a channel of the target subframe.

18. The wireless communication device of claim 17, wherein the processor is further configured to:

generate a candidate set of timing offsets and frequency offsets;

generate channel estimates based on the candidate set of timing offsets and frequency offsets; and perform the joint estimation of the timing offset, frequency offset, and channel based on the candidate set and the corresponding channel estimates.

* * * * *